United States Patent
Wankmueller

(10) Patent No.: US 8,527,427 B2
(45) Date of Patent: Sep. 3, 2013

(54) METHOD AND SYSTEM FOR PERFORMING A TRANSACTION USING A DYNAMIC AUTHORIZATION CODE

(75) Inventor: John Wankmueller, Great Neck, NY (US)

(73) Assignee: MasterCard International Incorporated, Purchase, NY (US)

( * ) Notice: Subject to any disclaimer, the term of this patent is extended or adjusted under 35 U.S.C. 154(b) by 0 days.

(21) Appl. No.: 11/746,765

(22) Filed: May 10, 2007

(65) Prior Publication Data
US 2007/0260544 A1    Nov. 8, 2007

Related U.S. Application Data

(63) Continuation of application No. PCT/US2005/040882, filed on Nov. 10, 2005.

(60) Provisional application No. 60/626,649, filed on Nov. 10, 2004.

(51) Int. Cl.
*G06Q 20/00* (2012.01)

(52) U.S. Cl.
USPC ............. 705/72; 705/64; 705/65; 705/67; 705/71; 235/379; 235/380; 235/382; 235/382.5

(58) Field of Classification Search
USPC ....... 705/64, 65, 67, 78, 71, 72, 75; 235/379, 235/380, 382, 382.5
See application file for complete search history.

(56) References Cited

U.S. PATENT DOCUMENTS

| | | | |
|---|---|---|---|
| 5,168,446 A * | 12/1992 | Wiseman | 705/37 |
| 5,892,900 A | 4/1999 | Ginter et al. | |
| 5,988,497 A * | 11/1999 | Wallace | 235/382.5 |
| 6,000,832 A * | 12/1999 | Franklin et al. | 700/232 |
| 6,138,168 A * | 10/2000 | Kelly et al. | 719/310 |
| 6,606,387 B1 * | 8/2003 | Abraham | 380/277 |
| 6,957,185 B1 * | 10/2005 | Labaton | 704/500 |
| 7,203,658 B1 * | 4/2007 | Gidwani et al. | 705/26.81 |
| 7,336,787 B2 * | 2/2008 | Unger et al. | 380/217 |
| 8,001,272 B2 * | 8/2011 | Murthy et al. | 709/245 |
| 8,019,647 B1 * | 9/2011 | Gidwani et al. | 705/26.8 |
| 8,186,586 B2 * | 5/2012 | Maddocks | 235/382.5 |
| 2002/0043566 A1 * | 4/2002 | Goodman et al. | 235/492 |
| 2004/0022444 A1 | 2/2004 | Rhoads | |
| 2005/0055318 A1 * | 3/2005 | Ziegler | 705/72 |
| 2006/0106606 A1 | 5/2006 | Labaton | |
| 2006/0237528 A1 * | 10/2006 | Bishop et al. | 235/380 |
| 2006/0259439 A1 * | 11/2006 | Mann et al. | 705/74 |
| 2009/0182676 A1 * | 7/2009 | Barbier et al. | 705/75 |

* cited by examiner

*Primary Examiner* — Mamon Obeid
(74) *Attorney, Agent, or Firm* — Baker Botts L.L.P.

(57) ABSTRACT

A method and apparatus for conducting a transaction involving transmission of a dynamic authentication code in place of a static PIN block using currently existing messaging standards or PIN acceptance devices. Minimal changes to existing processes an equipment are made while greatly improving security and fraud minimization.

17 Claims, 1 Drawing Sheet

US 8,527,427 B2

METHOD AND SYSTEM FOR PERFORMING A TRANSACTION USING A DYNAMIC AUTHORIZATION CODE

RELATED APPLICATION

This application is a continuation of International Application PCT/U.S.05/040882, filed Nov. 10, 2005, which claims priority from U.S. Provisional Application No. 60/626,649 filed Nov. 10, 2004, each of which is incorporated by reference in its entirety herein, and from which priority is claimed.

BACKGROUND OF INVENTION

The use of transaction or payment tokens, such as a credit card, debit card, or radio frequency device, is an increasingly important method for making payments, performing fund transfers, or effecting other transactions. These transactions can occur face-to-face at a point of sale, over the telephone, through the mail, over the Internet, or in other contexts. Regardless of the type of transaction, it is clearly desirable for all entities associated with the transaction to reduce the chance of fraud, through the unauthorized use of the transaction token and/or the payment account associated with the transaction token.

One approach to minimizing fraud is through the use of a personal identification number, or PIN which is managed in an international standardized way—such as according to ISO 9564. In one typical implementation of this approach, at the time of the transaction, the user's transaction card is inserted or swiped in a card reader. The reader extracts certain data from the card, such as an account number. The card reader then requests the user enter his or her PIN on a special keypad sometimes called a PinPad or PIN Entry Device (PED). The PIN is immediately encrypted and secured. The secured PIN data then is transmitted through secure means to an authorization location, such as an authorization computer, where cardholder data is stored. At the authorization computer, the account identification data is used to securely lookup or calculate the PIN for the account to verify that the PIN entered by the cardholder was correct. This approach minimizes fraud because the person in possession of the card must also know the secret PIN to complete the transaction.

The existing traditional internationally used architecture for a system for authenticating a static PIN transaction is shown in FIG. 1. A cardholder or user first enters a static PIN 101 at a terminal 103 having a secure PIN Entry Device ("PED") connected to a Point of Sale ("POS") terminal or ATM, where a payment card is accepted to perform a transaction. In traditional secure PEDs, the PIN is secured from the moment it is entered at the PIN pad. All PIN encryption, translation and decryption are performed in physically and logically secure hardware devices or facilities, whether secure PEDs, hardware security modules ("HSMs"), or secure facilities, all of which are well-known to those of ordinary skill in the art.

Each node in the network, such as the secure PED 103, shares an encryption key or key-pair with the node with which it communicates. These shared keys are sometimes referred to as "zone" keys, and they protect the communication link between nodes. Accordingly, the static PIN 101 entered at PED 103 may be encrypted with the shared key (Shared Key-1) that is associated with PED 103 and the Network Switch 111. The encrypted PIN 105 is placed in a PIN block portion of a traditional credit or debit network message containing other account and transaction information, formatted according to accepted standards, such as ISO 8583 or other standard format, using techniques well known to those having ordinary skill in the art.

The message is communicated to a Network Switch 111 having a HSM. In other network configurations, the message is first communicated from the terminal to an acquiring financial institution (not shown), such as a bank operating the ATM, in the case of an ATM transaction, or a bank where the merchant operating the terminal 103 maintains an account. That message is then routed to the network switch 111. The network switch 111 receives the PIN block and uses account information, such as the account number, or a portion thereof, to identify the bank or financial institution that issued the payment card, such as Bank A 117 or Bank B 119. The Network Switch 111 decrypts the PIN in the PIN Block 105 using Shared Key-1 within the HSM, so that it can change the encipherment key to be used in the next transmission. The switch 111 then re-encrypts the PIN Block with Shared Key-A 113 and transmits the encrypted PIN block in the PIN block portion of a traditional credit or debit network message to Bank A 117. Bank A 117 receives the message, decrypts the PIN block using Shared Key-A, and uses the account information in the message to find or calculate the PIN for the account associated with the transaction card being used, which is compared with the decrypted PIN information. If the comparison is successful, Bank A responds with a message indicating the PIN is verified, or the transaction was accepted. Otherwise, Bank A will send a message indicating the transaction is rejected.

Notably, participants in payment networks, such as merchants, acquiring financial institutions, and payment processors, have made substantial investments in the various secure computing hardware, software, communications links, secure PEDs, HSMs and other equipment associated with the static PIN messaging architecture shown in FIG. 1.

One disadvantage to this approach is that, because the PIN is static, a thief could capture the PIN when it is being entered through the use of a hidden camera or other methods during a legitimate transaction and reuse it in subsequent fraudulent transactions. A captured static PIN is usable by an attacker until it is discovered to be compromised.

SUMMARY OF THE INVENTION

The present invention addresses the drawback of the prior art architecture by employing a dynamic code in place of the static PIN in a financial network message with minimal changes required to existing payment systems.

In one exemplary embodiment of the present invention, a method is provided for authorizing a transaction using a transaction network having a standardized message format having a data portion reserved for a static PIN, including generating a dynamic code; preparing a transaction message in the standardized message format, the dynamic code inserted in the data portion of the message reserved for the static PIN; transmitting the transaction message to an authorization entity over a communications link; receiving a response from the authorization entity; and authorizing the transaction based on the response received from the authorization entity.

In another exemplary embodiment of the present invention, a method is provided for authorizing a transaction using a transaction network having a standardized message format having a data portion reserved for a static PIN, including generating a dynamic code; receiving a transaction message in the standardized message format, the message having the dynamic code inserted in the data portion reserved for the static PIN and also including account data; using at least the account data to determine an expected dynamic code; comparing the received dynamic code with the expected dynamic code; and authorizing the transaction based on the comparison.

In yet another exemplary embodiment of the present invention, a system is provided for authorizing a transaction, including: a transaction network employing a standardized message format having a data portion reserved for a static PIN; a dynamic code generator for generating a dynamic code; an account database storing information regarding one or more accounts; a receiver for receiving a transaction message in the standardized message format—the message having said dynamic code inserted in said data portion reserved for said static PIN, and said message including account data; a processor for (a) retrieving, using the account data, account information from the account database, (b) determining an expected dynamic code based on at least the retrieved account information, (c) comparing the received dynamic code to the expected dynamic code, and (d) authorizing a transaction in response to the comparison.

Advantageously, with the present invention, transaction security is greatly enhanced since an account holder is authenticated using a dynamic (not static) means. A dynamic code can be constructed to be a one-time-use only (one-use-PIN) providing no value to its capture by an attacker.

Also notable is that if dynamic codes or one-use-PINs of this present invention become ubiquitous, it eliminates the requirement to deploy secure PEDs for consumers and eliminate costly HSMs in back end systems to protect PINs. Therefore, the security costs to an overall PIN system could be drastically reduced.

BRIEF DESCRIPTION OF THE DRAWINGS

For a more complete understanding of the present invention, reference is made to the following detailed description of exemplary embodiments with reference to the accompanying drawings in which.

DETAILED DESCRIPTION OF THE EXEMPLARY EMBODIMENTS

Figure 1:
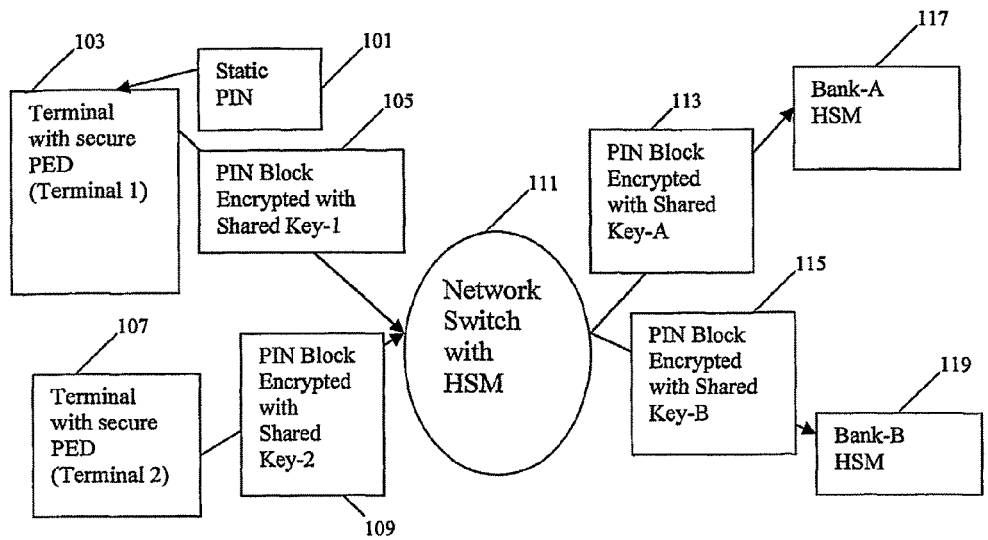
FIG. 1 is a block diagram showing a prior art transaction network architecture.
Figure 2:
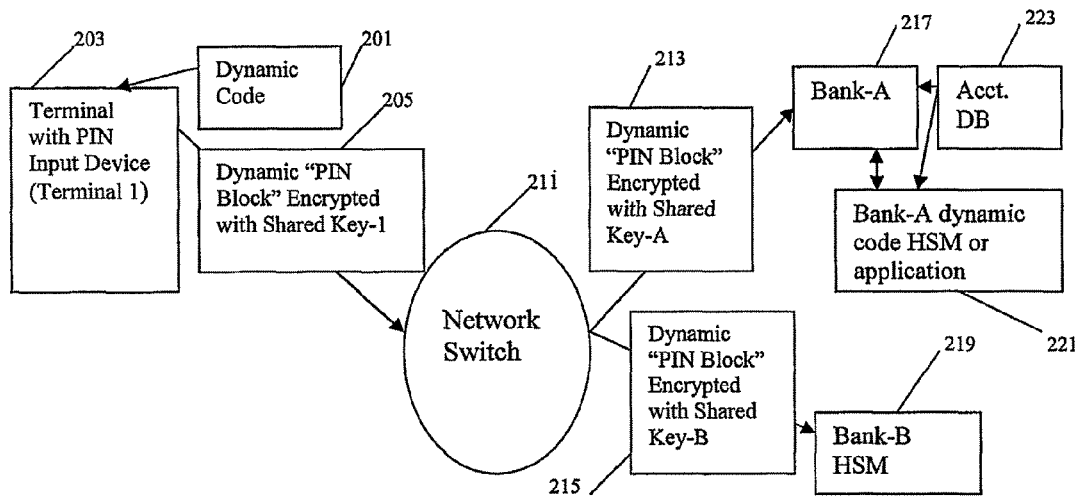
FIG. 2 is a block diagram showing one exemplary embodiment of the present invention.

One exemplary embodiment of the present invention is shown in FIG. 2. In this embodiment, techniques are permitted to use dynamic codes in place of static PINs in a transaction network employing a standardized message format with a minimum of change required to existing systems. The embodiment includes placing dynamic codes (encrypted or unencrypted) in a standard PIN block typically used for communicating static PIN values across a transaction network. By using existing, standard PIN blocks in the standardized message format for the transmission of the dynamic codes, new fields or data messages in network messages do not need to be created or added. The processing of dynamic codes by entities in the network is simplified because those entities already have hardware and software to process PIN blocks in the standardized, existing message format.

As shown in FIG. 2, the transaction begins with the generation of a dynamic code 201. This entails the user of a transaction or payment token or device, such as a credit card, debit card, or radio frequency device, activating a device for generating a dynamic code. The code could be generated by a smart card and a smart card reader compliant with MasterCard's Chip Authentication Program (CAP) Specifications. Those specifications are available by license from MasterCard International Incorporated in Purchase, N.Y. Smart cards and smart card readers are well known to persons of ordinary skill in the art. Various companies currently provide smart cards that support CAP functionality, including: Austria Card, Axalto, DNP, G&D, Gemplus, Orga, STM, Sagem, Setec, Toppan, and Winter AG. The following companies currently provide smart card readers that support CAP functionality: VASCO, Xiring, TODOS, ActivCard, AOS Hagenuk, and SCM Microsystems.

The dynamic codes may also be generated through a software application running on a mobile phone, such as described in MasterCard's co-pending patent application entitled "Method And System For Authorizing A Transaction Using A Dynamic Authorization Code," International Patent Application No. PCT/U.S.05/29758, filed on Aug. 18, 2005, claiming priority to provisional U.S. Patent Application No. 60/602,594, filed Aug. 18, 2004, both of which are incorporated herein by reference in their entireties. Alternatively, the dynamic code may be generated on any device capable of computing, including by way of examples (but not limited to) a smart card with a display, a personal digital assistant (PDA), a key fob device, a tablet personal computer (PC), a laptop PC, and a desktop PC. Of course, the software application executing on the computing device need not be CAP-compliant. Finally, dynamic codes may be generated by the issuing bank or other third party and supplied in hard copy form to the consumer.

The dynamic code may be a one-time code that is unique for each account and each authentication attempt. However, the dynamic code need not be strictly unique for each account and each authentication attempt. The codes may be allowed to overlap for accounts and to repeat over time so long as it remains difficult to re-use a code in an unauthorized manner such as by predicting the dynamic code associated with a particular pending or future transaction. In this context, the concept of limited-use numbers described in U.S. Pat. No. 6,636,833, issued to Flitcroft et al., may be applied to dynamic codes under the present invention. Accordingly, dynamic codes may be limited in their use based on certain conditions such as transaction value conditions (e.g., the dynamic codes are valid only for a particular one or a set of transactions or for transactions below a certain amount); time of transaction conditions (e.g., the dynamic codes are valid only for a certain time period); number of transactions conditions (e.g., the dynamic codes are valid only for a certain number of transactions); frequency of transactions conditions (e.g., the dynamic codes are valid for only a certain number of times per time period); purpose of transaction conditions; merchant type conditions, and geographical conditions.

In one exemplary embodiment, the dynamic code is generated based in part on a changing value known to the bank or financial institution that issued the card, such as Bank A 217. For example, a transaction counter may be maintained in a dynamic code generator possessed by the card holder and a copy of that counter may be maintained in a database maintained by the issuing Bank, such as in account database 223.

The dynamic codes may be manually entered into a terminal having a secure PED 203 by a cardholder, just as the cardholder would enter a PIN. Alternatively, the dynamic codes may be communicated directly by the cardholder's code generating device to a PED or other system using any communication technology and/or procedure. For example, if the code generating device is a smart card or keychain fob with proximity technology, the dynamic code may be communicated wirelessly by radio frequency (RF) communication to a PED 203 or other computer system with RF receiving capabilities.

In another exemplary embodiment, instead of a secure PED 203 as shown in FIG. 2, the merchant or other payees could employ non-secure data entry devices for the dynamic code entry, because the dynamic nature of the code provides its own form of security. For example, in the case of an e-commerce transaction, the dynamic code could be entered at a home computer by a cardholder wishing to make a purchase. The code could be entered in the appropriate field of a merchant's online order form. In the case of mail transactions, the dynamic code could be written on an order form, and in the case of telephone transactions the dynamic code could be communicated verbally or by touch tone signaling over the telephone.

In addition, a non-secure PED embodiment may allow new retail payment models, such as a "shopping buddy" model. In the shopping buddy model, a physical shopping basket or cart may include an interactive device (such as a display with buttons) that can help the consumer shop for what he or she needs (for example, by providing a store directory or aisle information on products). In addition, the interactive device (shopping buddy) can include a means for accepting a payment card (e.g., magnetic stripe reader, smart card reader, proximity card reader) and a PIN pad. It would be cost-prohibitive to include a secure PED with each shopping cart, but this would not be necessary if a dynamic code were used according to the present invention.

Once the code is either entered or conveyed to a merchant terminal or computer, such as terminal 203, the dynamic code can be encrypted 205 using an encryption key shared (such as Shared Key-1) between the terminal 203 and the next device in the communications chain, such as network switch 211. There may be one or more intermediary nodes between terminal 203 and network switch 211, such as an acquiring financial institution computer (not shown). In such a case, the message may be encrypted as it traveled between the various nodes in a similar manner to that described herein. The dynamic code information is coupled with other transaction information, such as the primary account number (PAN) associated with the cardholder, card expiration date, transaction amount, and other data regarding the transaction. This information is formatted into a financial network message according to a message standard established by the transaction network members, the network message standard including a portion reserved for a static PIN. One example of such a network message standard is ISO-8583, although other message standards that are designed to carry a static PIN could be used. The dynamic code information is placed in the portion of the message reserved for the static PIN and transmitted over the communication link.

Once the message is received at the network switch 211, the switch uses certain transaction data, such as the PAN, a portion thereof, or some other transaction data, to identify the bank that issued the card being used. In one exemplary embodiment, the switch decrypts the encrypted dynamic code information using the key shared with the prior node in the network (such as Shared Key-1) in a hardware security module (not shown). Alternatively, it may not be necessary to encrypt the dynamic code, as discussed previously. The dynamic code may be encrypted using a key shared between the network 211 and the destination computer, such as Bank A 217. The message with the dynamic code is then forwarded 213 to the destination bank, 217, or an entity performing processing services for that bank.

Once the message is received at the destination bank, such as Bank A 217, the received dynamic code, i.e., a first dynamic code, may be decrypted, using the key shared with the prior node, such as Shared Key-A. This may occur in a HSM or secure application 221 at Bank A to operate with legacy systems. Alternatively, if the dynamic code was not encrypted prior to transmission to Bank A 217, the code need not be decrypted. Hardware and/or software systems at Bank A would then extract transaction data from the message to determine an expected dynamic code, i.e., a second dynamic code, associated with the transaction. For example, the PAN or other identifying information may be used to look up information in an account database 223 containing data associated with the account being used to perform the requested transaction. Account database 223 may include a transaction counter associated with the account, the payment token, such as a credit or debit card, or the code generator being used to perform the transaction, if separate from the payment token. This counter may be synchronized with a counter maintained in the payment token or code generator device. A portion of the dynamic code itself could be used to transmit information from the code generator to Bank A to maintain the synchronization of the counter. This counter together with other secret data known to Bank A and securely stored on the code generator (such as an encryption key or key pair) and optionally other transaction data (such as transaction amount, transaction date/time, an unpredictable number, etc.) can be used, in conjunction with an algorithm shared between the code generator and Bank A, to calculate an expected dynamic code associated with the particular transaction.

If the expected dynamic code matches the dynamic code received in the financial message, Bank A may approve the transaction, or perform further processing to verify whether or not the transaction should be approved (such as determining whether the payment token or code generator has been reported lost or stolen, determining whether credit limits have been exceeded, etc.). If the expected dynamic code does not match the received dynamic code, the transaction may be rejected. An appropriate response message would then be communicated between Bank A 217 and Terminal 203 over a communication link. A merchant can then permit or reject the transaction based on the response.

In one exemplary embodiment, an issuer bank, such as Bank A, wishing to issue a payment token and/or code generating device in accordance with the present invention, would reprogram its computers to perform the calculations necessary to perform authentication of the dynamic codes. In another exemplary embodiment, the issuer bank could maintain its established static PIN authentication systems and insert a new HSM or hardware/software component into its PIN processing system to handle processing of the dynamic code transactions. For example, a dynamic code HSM, designed to calculate expected dynamic codes, could be integrated in series with—before or after—the process to validate static PINs. In other words, the application for processing messages at Bank A 217 that include PINs will first send the PIN Block to either the static PIN HSM or the dynamic code HSM. If the first HSM replies with a negative response (i.e. rejects the PIN in the message), the application would then send the PIN block to the other HSM. If either the static PIN HSM or dynamic code HSM responds that the "PIN block" was valid, the PIN/dynamic code would be considered valid. If both HSMs respond that the PIN/dynamic code was invalid, the transaction would be rejected. This embodiment would entail minimum impact to existing PIN processing systems at issuer financial institutions.

In one exemplary embodiment, an issuer bank, such as Bank A 217, may identify whether a message contains a static PIN or a dynamic code based on some characteristic of the message. For example, the PAN or Bank Identification Number (BIN) portion of a financial message may indicate to the issuer whether the payment token/account being used to perform the transaction uses a static PIN or a dynamic code. Based on this determination, the bank would route the message to the appropriate processing operations to verify the PIN or dynamic code.

Although the present invention has been described with reference to certain preferred embodiments, various modifications, alterations, and substitutions will be known or obvious to those having ordinary skill in the art without departing from the spirit and scope of the invention. Numerous other applications of the present invention will be apparent to one of ordinary skill in the art.

I claim:

1. A method for authorizing a transaction between an account holder and a merchant over a transaction network employing an ISO 8583 standardized message format having a data portion reserved for a static PIN, comprising:
   providing an account holder with access to a code generating device;
   generating by said code generating device a dynamic code, said dynamic code being generated based on a value that changes before a new transaction and said dynamic code is insertable in said data portion reserved for said static PIN;
   receiving, at a PIN processing system comprising a static PIN authentication system and a dynamic code authentication system, a transaction message in said message format, said message including one of the static PIN or the dynamic code;
   determining, based on the transaction message, whether the received transaction message includes the static PIN or the dynamic code;
   in response to determining that the transaction message includes the dynamic code, generating by said dynamic code authentication system an expected dynamic code;
   comparing, by said dynamic code authentication system, the received dynamic code to the generated expected dynamic code; and
   authorizing the transaction in response to the comparing step.

2. The method of claim 1 wherein the dynamic code is generated based at least in part on a counter value that changes before each new transaction.

3. The method of claim 1, wherein generating by said dynamic code authentication system the expected dynamic code comprises using at least received account data to generate the expected dynamic code.

4. The method of claim 3 wherein using at least the received account data includes the step of retrieving from an account database information associated with said code generating device.

5. The method of claim 4 wherein retrieving from an account database includes retrieving a counter value associated with said code generating device.

6. The method of claim 1, wherein the transaction message includes an unencrypted version of the dynamic code.

7. A system for authorizing a transaction between an account-holder and a merchant, comprising:
   a transaction network employing an ISO 8583 standardized message format having a data portion reserved for a static PIN;
   a code generating device for generating a dynamic code based on a value that changes before a new transaction and the dynamic code is insertable into the data portion reserved for the static PIN;
   a receiver for receiving a transaction message in said message format, said transaction message including one of the static PIN or the dynamic code; and
   a PIN processing system comprising a static PIN authentication system and a dynamic code authentication system, the PIN processing system comprising a processor for (a) determining, based on the transaction message, whether the received transaction message includes the static PIN or the dynamic code, (b) in response to determining that the transaction message include the dynamic code, generating an expected dynamic code, (c) comparing the received dynamic code to the generated expected dynamic code, and (d) authorizing the transaction in response to the comparing step.

8. The system of claim 7, wherein said dynamic code generator includes a stored counter value that changes before each new transaction.

9. The system of claim 7, wherein the code generating device comprises a smart card.

10. The system of claim 7, wherein the code generating device comprises a mobile phone.

11. The system of claim 7, wherein the code generating device comprises a key fob device.

12. The system of claim 7, wherein the code generating device comprises a tablet personal computer.

13. A system for authorizing a transaction between an account holder and a merchant over a transaction network employing an ISO 8583 standardized message format having a data portion reserved for a static PIN, comprising:
   a first non-transitory computer readable storage medium with a first executable program stored there, wherein the first program instructs a first processor to generate a dynamic code based on a value that changes before a new transaction and said dynamic code is insertable in said data portion reserved for said static PIN; and
   a second non-transitory computer-readable storage medium with a second executable program stored thereon, wherein the second program instructs a second processor to perform the following steps:
      receiving a transaction message in said message format, said transacion message including one of the static PIN or the dynamic code;
      determining, based on the transaction message, whether the received transaction message includes the static PIN or the dynamic code;
      in response to determining that the transaction message includes the dynamic code, generating an expected dynamic code;
      comparing the received dynamic code to the generated expected dynamic code; and
      authorizing the transaction in response to the comparing step.

14. The system of claim 13, wherein the first program instructs the first processor to generate the dynamic code based at least in part on a counter value that changes before the new transaction.

15. The system of claim 13, wherein the second program instructs the second processor to generate the expected dynamic code using at least account data contained in the transaction message.

16. The method of claim 15, wherein using at least the received account data contained in the transaction message includes retrieving from an account database information associated with the first program.

17. The method of claim 16 wherein retrieving from an account database includes retrieving a counter value associated with the first program.

* * * * *